(12) United States Patent
Chen

(10) Patent No.: US 9,393,541 B2
(45) Date of Patent: *Jul. 19, 2016

(54) TEMPERATURE REGULATION OF MEASUREMENT ARRAYS

(71) Applicant: Genia Technologies, Inc., Mountain View, CA (US)

(72) Inventor: Roger J. A. Chen, Saratoga, CA (US)

(73) Assignee: Genia Technologies, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/794,524

(22) Filed: Jul. 8, 2015

(65) Prior Publication Data

US 2016/0001250 A1 Jan. 7, 2016

Related U.S. Application Data

(63) Continuation of application No. 13/276,200, filed on Oct. 18, 2011, now Pat. No. 9,110,478.

(60) Provisional application No. 61/436,948, filed on Jan. 27, 2011.

(51) Int. Cl.
*G05D 23/00* (2006.01)
*B01J 19/00* (2006.01)
*G05D 23/20* (2006.01)

(52) U.S. Cl.
CPC ......... *B01J 19/0046* (2013.01); *G05D 23/2034* (2013.01); *B01J 2219/00495* (2013.01); *B01J 2219/00698* (2013.01)

(58) Field of Classification Search
CPC ............ G05D 23/2034; G05D 23/2036; B01J 19/0013; B01J 2219/00698
USPC .......... 422/68.1, 82.01, 82.12, 407, 551, 552, 422/560, 109
See application file for complete search history.

(56) References Cited

U.S. PATENT DOCUMENTS 9,110,478 B2 * 8/2015 Chen
2008/0221806 A1 * 9/2008 Bryant ................. G01N 27/127
702/22

* cited by examiner

*Primary Examiner* — Jill Warden
*Assistant Examiner* — Dwayne K Handy
(74) *Attorney, Agent, or Firm* — Van Pelt, Yi & James LLP

(57) ABSTRACT

A system for regulating a temperature of a measurement array is disclosed. The system includes a measurement array including a plurality of sensors, wherein the plurality of sensors are integrated onto an integrated circuit die. The system includes a thermal sensor integrated onto the integrated circuit die, wherein the thermal sensor senses a temperature associated with the plurality of sensors. The system further includes a heat pump coupled to the integrated circuit die, wherein the heat pump is controlled by a feedback control circuit including the thermal sensor.

21 Claims, 4 Drawing Sheets

TEMPERATURE REGULATION OF MEASUREMENT ARRAYS

CROSS REFERENCE TO OTHER APPLICATIONS

This application is a continuation of co-pending U.S. patent application Ser. No. 13/276,200, entitled TEMPERATURE REGULATION OF MEASUREMENT ARRAYS, filed Oct. 18, 2011, which claims priority to U.S. Provisional Patent Application No. 61/436,948, entitled TEMPERATURE REGULATION OF BIOCHEMICAL MEASUREMENT ARRAYS, filed Jan. 27, 2011, both of which are incorporated herein by reference for all purposes.

BACKGROUND OF THE INVENTION

Advances in micro-miniaturization within the semiconductor industry in recent years have enabled biotechnologists to begin packing their traditionally bulky sensing tools into smaller and smaller form factors, onto so-called biochips. It would be desirable to develop techniques for biochips.

BRIEF DESCRIPTION OF THE DRAWINGS

Various embodiments of the invention are disclosed in the following detailed description and the accompanying drawings.

DETAILED DESCRIPTION

Figure 1:
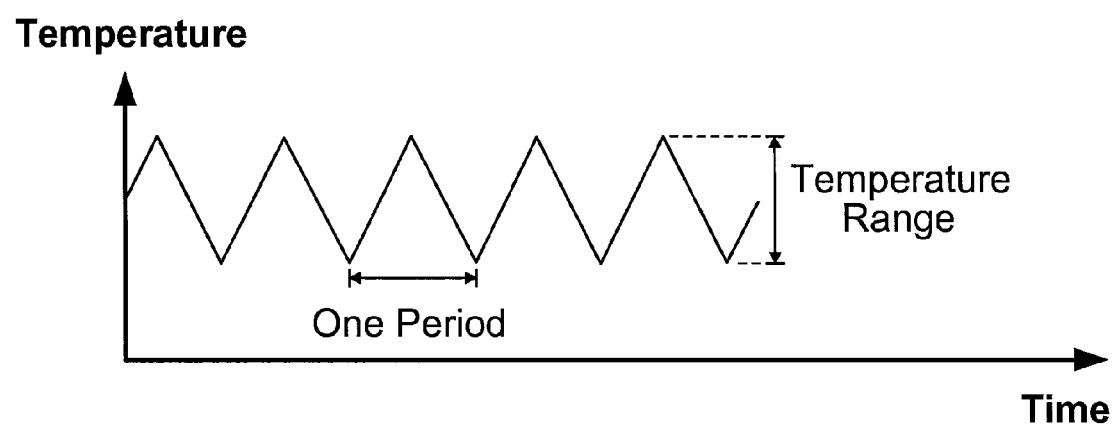
FIG. 1 is a diagram illustrating the short time duration variability in the temperature in a biochemical measurement array in which a bang-bang temperature control mechanism is used.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

In various embodiments, the techniques described herein are implemented in a variety of systems or forms. In some embodiments, the techniques are implemented in hardware as an application-specific integrated circuit (ASIC) or a field-programmable gate array (FPGA). In some embodiments, a processor (e.g., an embedded one such as an ARM core) is used where the processor is provided or loaded with instructions to perform the techniques described herein. In some embodiments, the technique is implemented as a computer program product which is embodied in a computer readable storage medium and comprises computer instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Biochemical sensors are devices that can measure a variable biochemical quantity and transform the measurement into output signals, e.g., an electrical signal or a light signal, according to certain rules. Biochemical sensors may be electrochemical sensors or optical sensors. Biochemical sensors may be employed in a variety of applications; for example, they may be used for nucleotide sequencing, medical diagnosis, patient monitoring, and the like.

A nanopore array is one example of measurement arrays that use biochemical sensors for biochemical measurements. A nanopore array for nucleotide sequencing may contain thousands or millions of single cells or measurement sites. Each cell contains a nanopore, which is a small hole in an electrically insulating membrane that can be used as a single-molecule sensor. A nanopore may be formed using a biological material, such as α-hemolysin or MspA. A nanopore may be formed using a solid-state material, such as a semiconductor material. When a small voltage is applied across a nanopore, an ionic current through the nanopore can be measured to provide information about the structure of a molecule transiting the nanopore. In a single cell of a nanopore array, an electrical circuit may be used for controlling the electrical stimulus applied across a lipid bilayer which contains the nanopore, and for sensing the electrical patterns, or signatures, of a molecule passing through the nanopore.

In some applications, biochemical measurement arrays may be used to take precise biochemical measurements; however, their performance can be affected by the temperature at the site of the measurements. Typically, biochemical sensors are mounted on, or are an integral part of, an integrated circuit. Since the measurements made by the biochemical sensors are taken directly from the surface of integrated circuits which may produce heat, the accuracy and variability of the temperature at the site of the measurements need to be carefully controlled; otherwise, performance degradation will result.

Temperature regulation of biochemical measurement arrays is challenging for several reasons. Transducing temperature at the exact point of biochemical measurements is difficult. Furthermore, any temperature difference between the point of thermal measurement and the point of biochemical measurement will translate into errors in regulating the temperature at the point of biochemical measurement.

In some temperature regulation schemes, a bang-bang control mechanism is employed. A bang-bang controller is a feedback controller that switches abruptly between two states. For example, a cooling or heating element is turned either full on or full off, without being run at any intermediate levels. This technique simplifies the temperature regulation circuitry, but introduces short time duration variability (ripples) in the temperature at the site of the biochemical measurements.

FIG. 1 is a diagram illustrating the short time duration variability in the temperature in a biochemical measurement array in which a bang-bang temperature control mechanism is used. As shown in FIG. 1, these ripples may fluctuate in a temperature range in excess of half a degree centigrade over a period that lasts from milli-seconds to minutes. However, in order to achieve precise control of the temperature at the site of the biochemical measurements, the temperature fluctuation should be much less than half a degree centigrade over all time scales.

Figure 2A:
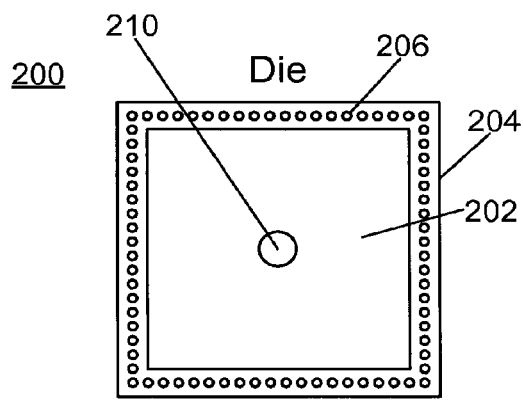
FIG. 2A is a diagram illustrating the top view of a biochemical measurement chip 200.
Figure 2B:
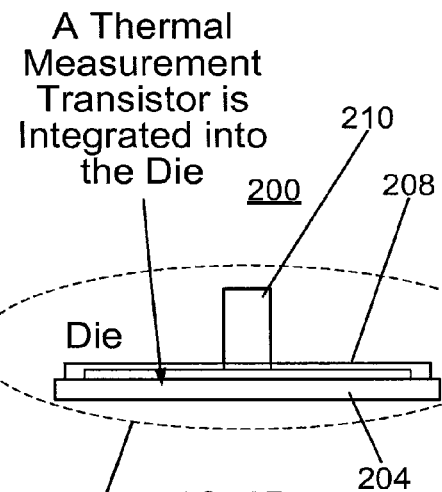
FIG. 2B is a diagram illustrating the side view of the same biochemical measurement chip as shown in FIG. 2A.

FIG. 2A is a diagram illustrating the top view of a biochemical measurement chip 200. FIG. 2B is a diagram illustrating the side view of the same biochemical measurement chip as shown in FIG. 2A. With reference to FIG. 2A and FIG. 2B, a biochemical measurement array 202 is located in the central region of the top surface of an integrated circuit die 204. The biochemical measurement array 202 has multiple columns and rows of biochemical measurement sites. A plurality of bonding pads situated at the peripheral of integrated circuit die 204, are electrical contacts for communicating with the biochemical measurement array 202. A reservoir 208 may be mounted on integrated circuit die 204 to hold a liquid which covers the surface of biochemical measurement array 202. The liquid which covers the surface of biochemical measurement array 202 may be introduced through a channel 210.

Figure 2C:
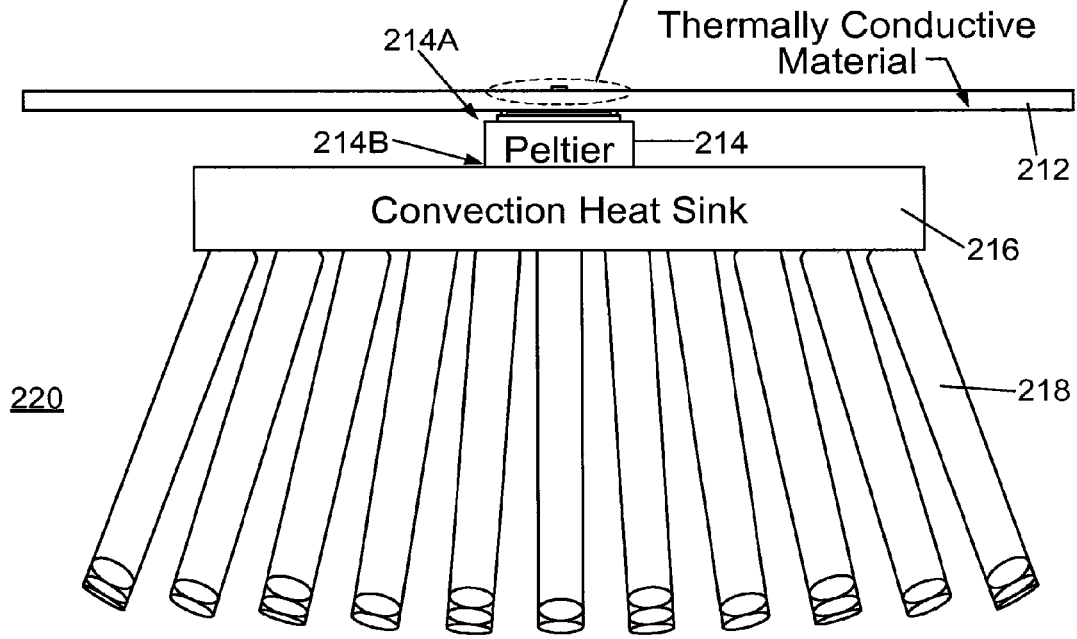
FIG. 2C is a diagram illustrating an embodiment of a temperature regulating system for the biochemical measurement chip 200 as shown in FIGS. 2A and 2B.

FIG. 2C is a diagram illustrating an embodiment of a temperature regulating system 220 for the biochemical measurement chip 200 depicted in FIGS. 2A and 2B. The biochemical measurement chip 200 is mounted on a thermally conductive material 212. A first side 214A of a Peltier device 214 is mounted on the bottom surface of integrated circuit die 204. A second side 214B of Peltier device 214 is mounted on a convection heat sink 216, which may include pin-fins 218. A Peltier device, also known as a Peltier heat pump, solid state refrigerator, or thermoelectric cooler (TEC), is a solid-state, active heat pump which transfers heat from one side of the device to the other side against the temperature gradient (from cold to hot), with consumption of energy. When DC current runs through a Peltier device, heat is removed from one side to the other. Therefore, a Peltier device can be used either for heating or for cooling, and it can also be used as a temperature controller that either heats or cools.

In some embodiments, the first side 214A of Peltier device 214 has a surface large enough to cover the entire bottom surface of integrated circuit die 204 or the entire biochemical measurement array 202, such that the temperature of the entire integrated circuit die 204 or the entire biochemical measurement array 202 can be maintained at a predetermined operating temperature. In some embodiments, the predetermined operating temperature is configurable and is selected from a plurality of operating temperatures.

Figure 3:
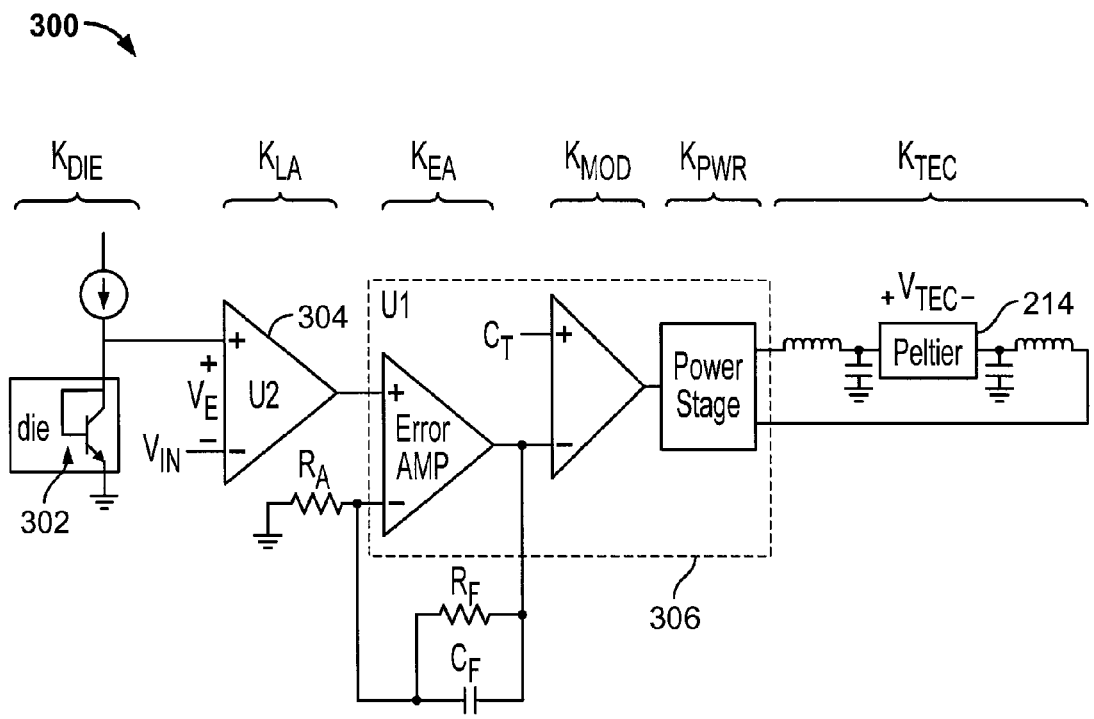
FIG. 3 is a diagram illustrating an embodiment of a linear feedback control circuit 300 for driving Peltier device 214 in FIG. 2C.

FIG. 3 is a diagram illustrating an embodiment of a linear feedback control circuit 300 for driving Peltier device 214 in FIG. 2C. As shown in FIG. 3, a thermal measurement transistor 302 (e.g., a diode connected transistor) is coupled with an amplifier 304. The output of amplifier 304 is fed as an input to a thermoelectric cooler controller chip 306 (e.g., LTC1923 from Linear Technology), and the output of thermoelectric cooler controller chip 306 is used to drive Peltier device 214.

Typically, a biochemical measurement chip may include as many as one million biochemical measurement sites. Since each biochemical measurement site may consume as much as 3.3 μW (1 μA at 3.3 V), a total of 3.3 W may be consumed by the entire biochemical measurement chip. In the absence of temperature regulating system 220, which efficiently pumps heat away from the die, the power consumed by the circuitry of the biochemical measurement chip may cause the die to overheat.

With reference to FIG. 2B and FIG. 3, the thermal measurement transistor 302 is integrated into die 204. The advantage of integrating thermal measurement transistor 302 into die 204 is that direct measurements of the die temperature can thereby be made. As described above, heat is generated within the die itself If the thermal measurement transistor is external to the die, the thermal resistance between the die and the thermal measurement transistor will increase, causing a large thermal gradient to be established across the distance between the die and the thermal measurement transistor. Consequently, an accurate measurement of the temperature of the die cannot be made. Note that in some embodiments, more than one thermal measurement transistor 302 can be integrated into die 204. The example with a single thermal measurement transistor 302 is provided for illustration purposes only; accordingly, the present application is not limited to this specific example only: the temperature sensor could be a transistor, a diode, a temperature-sensitive resistor or other temperature sensitive device included on the die.

The temperature regulating system 220 as described in the present application provides an asymptotically Lyapunov stable linear control loop for regulating the temperature of biochemical measurement chip 200. In particular, the mechanical arrangement of the various components in temperature regulating system 220 ensures that the system thermal time constants are asymptotically Lyapunov stable.

Figure 4:
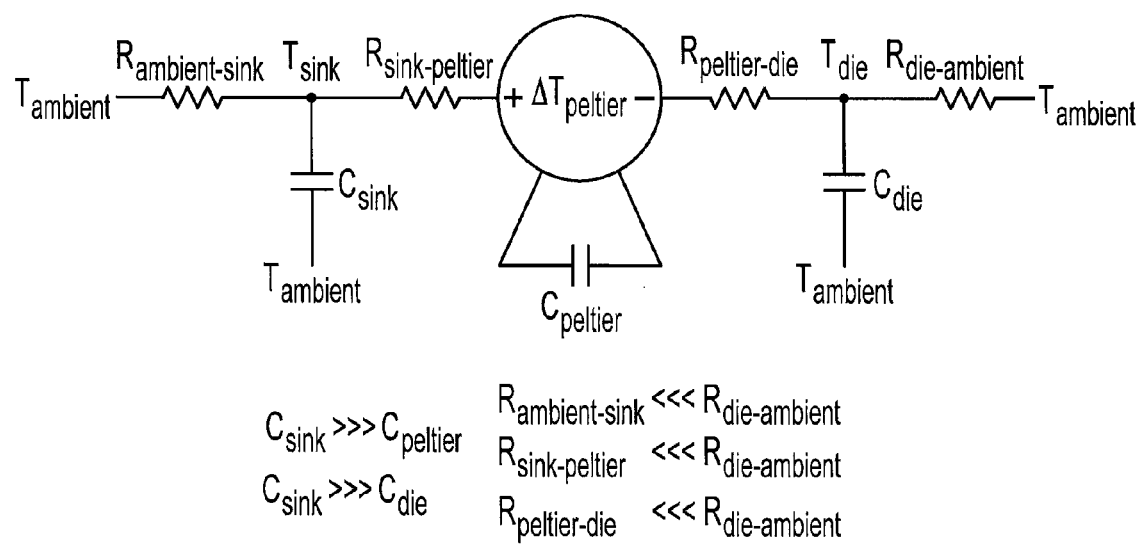
FIG. 4 is a diagram illustrating a thermal model for temperature regulating system 220.

FIG. 4 is a diagram illustrating a thermal model for temperature regulating system 220. In FIG. 4, "R" denotes thermal resistance (in Kelvins/Watt). For example, $R_{die\text{-}ambient}$ is the thermal resistance between die 204 and the ambient air surrounding the die. "C" denotes thermal capacitance (in Joules/Kelvin), and "T" denotes temperature (in Kelvin) at a specific location. In order to achieve closed loop stability, the thermal capacitance C and thermal resistance R for various components satisfy a set of criteria as shown at the bottom of FIG. 4. In particular, the thermal capacitance of convection heat sink 216 should be several times larger (e.g., ten times larger) than the thermal capacitance of Peltier device 214 and the thermal capacitance of die 204. The thermal resistance between the die and the ambient air surrounding the die, $R_{die\text{-}ambient}$, should be several times (e.g., ten times larger) larger than $R_{ambient\text{-}sink}$, $R_{sink\text{-}peltier}$, and $R_{peltier\text{-}die}$.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system for regulating a temperature of a measurement array, comprising:
    a measurement array including a plurality of sensors, wherein the plurality of sensors are integrated onto an integrated circuit die;

a thermal sensor integrated onto the integrated circuit die, wherein the thermal sensor senses a temperature associated with the plurality of sensors; and a heat pump coupled to the integrated circuit die and coupled to a heat sink, wherein the heat pump is controlled by a feedback control circuit including the thermal sensor;

wherein the feedback control circuit includes an amplifier coupled to the thermal sensor and further includes a thermoelectric controller; and wherein thermal behaviors of the system are represented by a thermal model including a plurality of thermal parameters, wherein the thermal parameters comprise thermal resistances and thermal capacitances measured with respect to a plurality of components of the system, including the heat pump, the heat sink, and the integrated circuit die, and wherein the system forms an asymptotically Lyapunov stable linear control loop based at least in part on satisfying a plurality of relationships between two thermal parameters associated with the thermal model, the plurality of relationships comprising:

a thermal resistance between the integrated circuit die and ambient air surrounding the integrated circuit die is substantially larger than a thermal resistance between the heat sink and ambient air surrounding the heat sink.

2. The system of claim 1, wherein the measurement array comprises a biochemical measurement array, and wherein each of the plurality of sensors comprises a biochemical sensor.

3. The system of claim 1, wherein the feedback control circuit is configured to maintain the temperature associated with the plurality of sensors at a predetermined temperature, and wherein the predetermined temperature is configurable.

4. The system of claim 1, wherein sensing the temperature associated with the plurality of sensors comprises sensing a temperature associated with the integrated circuit die.

5. The system of claim 1, wherein the heat pump comprises a Peltier heat pump.

6. The system of claim 1, wherein the heat pump includes a first surface in contact with the integrated circuit die and a second surface in contact with the heat sink, and wherein heat is transferred from one surface to another.

7. The system of claim 1, wherein the feedback control circuit is configured as a linear feedback control circuit.

8. A system for regulating a temperature of a measurement array, comprising:

a measurement array including a plurality of sensors, wherein the plurality of sensors are integrated onto an integrated circuit die;

a thermal sensor integrated onto the integrated circuit die, wherein the thermal sensor senses a temperature associated with the plurality of sensors; and a heat pump coupled to the integrated circuit die and coupled to a heat sink, wherein the heat pump is controlled by a feedback control circuit including the thermal sensor;

wherein the feedback control circuit includes an amplifier coupled to the thermal sensor and further includes a thermoelectric controller; and wherein thermal behaviors of the system are represented by a thermal model including a plurality of thermal parameters, wherein the thermal parameters comprise thermal resistances and thermal capacitances measured with respect to a plurality of components of the system, including the heat pump, the heat sink, and the integrated circuit die, and wherein the system forms an asymptotically Lyapunov stable linear control loop based at least in part on satisfying a plurality of relationships between two thermal parameters associated with the thermal model, the plurality of relationships comprising:

a thermal resistance between the integrated circuit die and ambient air surrounding the integrated circuit die is substantially larger than a thermal resistance between the heat sink and the heat pump.

9. The system of claim 8, wherein the measurement array comprises a biochemical measurement array, and wherein each of the plurality of sensors comprises a biochemical sensor.

10. The system of claim 8, wherein the feedback control circuit is configured to maintain the temperature associated with the plurality of sensors at a predetermined temperature, and wherein the predetermined temperature is configurable.

11. The system of claim 8, wherein sensing the temperature associated with the plurality of sensors comprises sensing a temperature associated with the integrated circuit die.

12. The system of claim 8, wherein the heat pump comprises a Peltier heat pump.

13. The system of claim 8, wherein the heat pump includes a first surface in contact with the integrated circuit die and a second surface in contact with the heat sink, and wherein heat is transferred from one surface to another.

14. The system of claim 8, wherein the feedback control circuit is configured as a linear feedback control circuit.

15. A system for regulating a temperature of a measurement array, comprising:

a measurement array including a plurality of sensors, wherein the plurality of sensors are integrated onto an integrated circuit die;

a thermal sensor integrated onto the integrated circuit die, wherein the thermal sensor senses a temperature associated with the plurality of sensors; and a heat pump coupled to the integrated circuit die and coupled to a heat sink, wherein the heat pump is controlled by a feedback control circuit including the thermal sensor;

wherein the feedback control circuit includes an amplifier coupled to the thermal sensor and further includes a thermoelectric controller; and wherein thermal behaviors of the system are represented by a thermal model including a plurality of thermal parameters, wherein the thermal parameters comprise thermal resistances and thermal capacitances measured with respect to a plurality of components of the system, including the heat pump, the heat sink, and the integrated circuit die, and wherein the system forms an asymptotically Lyapunov stable linear control loop based at least in part on satisfying a plurality of relationships between two thermal parameters associated with the thermal model, the plurality of relationships comprising:

a thermal resistance between the integrated circuit die and ambient air surrounding the integrated circuit die is substantially larger than a thermal resistance between the heat pump and the integrated circuit die.

16. The system of claim 15, wherein the measurement array comprises a biochemical measurement array, and wherein each of the plurality of sensors comprises a biochemical sensor.

17. The system of claim 15, wherein the feedback control circuit is configured to maintain the temperature associated with the plurality of sensors at a predetermined temperature, and wherein the predetermined temperature is configurable.

18. The system of claim 15, wherein sensing the temperature associated with the plurality of sensors comprises sensing a temperature associated with the integrated circuit die.

19. The system of claim 15, wherein the heat pump comprises a Peltier heat pump.

20. The system of claim 15, wherein the heat pump includes a first surface in contact with the integrated circuit die and a second surface in contact with the heat sink, and wherein heat is transferred from one surface to another.

21. The system of claim 15, wherein the feedback control circuit is configured as a linear feedback control circuit.

\* \* \* \* \*